Figure 1:
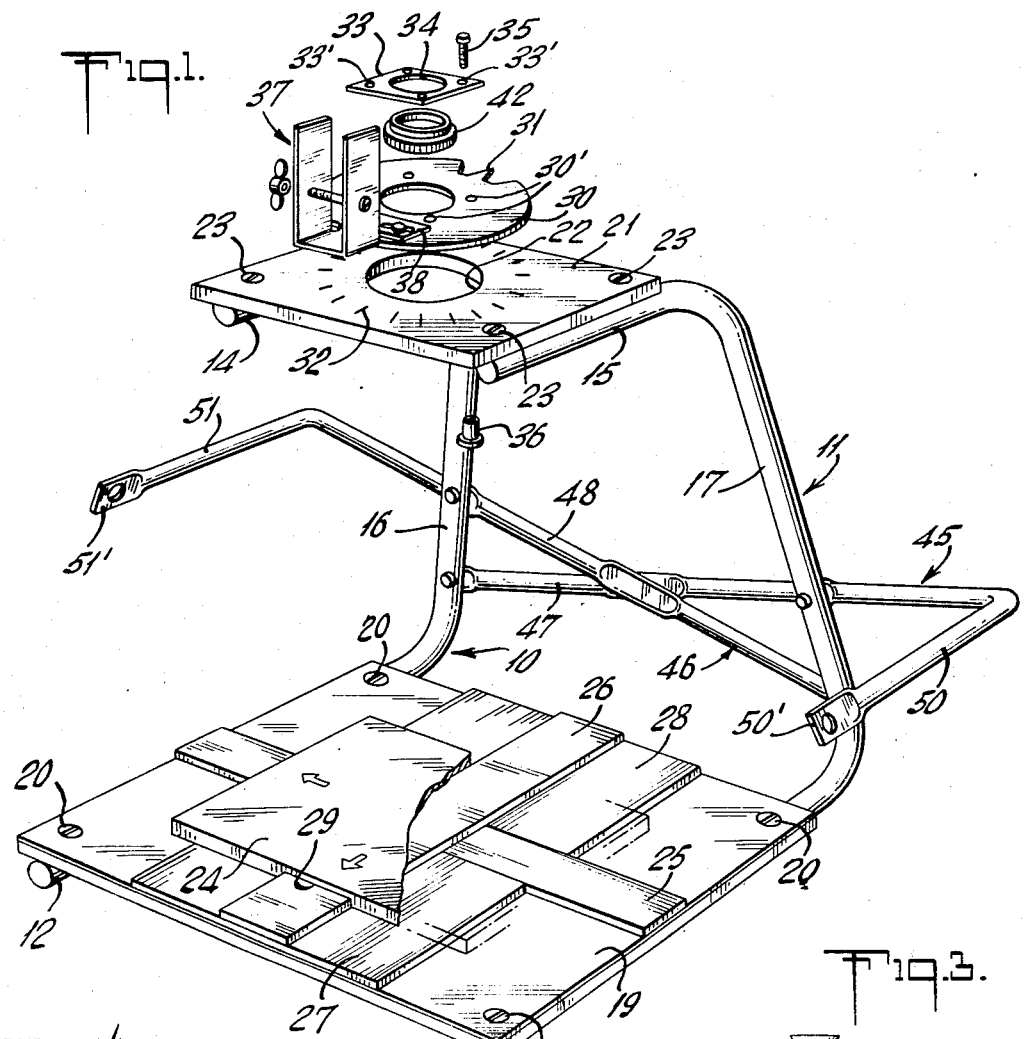

United States Patent [19]
Oxbery

[11] 3,758,205
[45] Sept. 11, 1973

[54] PHOTOGRAPHIC STAND

[75] Inventor: John W. Oxbery, New Rochelle, N.Y.

[73] Assignee: Ox Products Inc., Mamaroneck, N.Y.

[22] Filed: July 3, 1972

[21] Appl. No.: 268,629

[52] U.S. Cl.......................... 355/18, 95/86, 355/64
[51] Int. Cl. ........................................... G03b 27/32
[58] Field of Search .................... 95/11, 86; 355/18, 355/64

[56] References Cited
UNITED STATES PATENTS

| | | | |
|---|---|---|---|
| 2,249,730 | 7/1941 | Gentry................................... | 355/72 |
| 2,107,074 | 2/1938 | Hineline............................... | 355/64 |
| 3,064,547 | 11/1962 | Humphries............................. | 95/86 |
| 1,885,555 | 11/1932 | Schwartz............................... | 355/39 |

*Primary Examiner*—John M. Horan
*Attorney*—Eugene E. Geoffrey, Jr.

[57] ABSTRACT

A photographic stand having a work surface including a plate universally movable in the plane of the work surface for supporting the images and articles to be photographed, a camera supporting plate positioned centrally and above the work surface, a frame carrying both the work surface and camera supporting plate and having means for holding light sources for illuminating the work surface and a rotatable camera mount on the camera supporting plate. In this way a variety of interesting and unusual effects can be obtained by both rotation of the camera and displacement of the image or article during the photographic operation.

2 Claims, 5 Drawing Figures

PHOTOGRAPHIC STAND

This invention relates to photographic apparatus and more specifically to a novel and improved photographic stand having a work supporting surface and camera support that facilitates the achievement of various artistic effects.

Numerous devices have been suggested for photographing images and articles on a work surface but such devices are relatively complicated and expensive and are principally intended for commercial use. Devices adapted for use with motion picture cameras and embodying a movable work surface are even more complicated and expensive and, at the same time, occupy considerable space. This invention provides a novel and improved photographic stand characterized by its simplicity and relatively low cost and which includes a work surface for images and articles and means for supporting a motion picture or other camera wherein the camera can be rotated and the work surface can be moved to produce various photographic effects. The stand, in accordance with the invention, may be readily assembled and disassembled for shipping and storage, thus making it advantageous for use by both the amateur and professional photographer alike.

Another object of the invention resides in the provision of a novel and improved stand having a camera support and work surface for supporting articles and images to be photographed wherein the camera can be rotated and the articles or images simultaneously displaced in any direction on the bed by a single operator so that a wide variety of artistic effects can be easily and quickly achieved.

Still, another object of the invention resides in the provision of a novel and improved photographic stand.

The invention embodies a pair of generally U-shaped frame members having the work surface secured to one leg of each frame member and a camera support is secured to the other leg of each frame member. The camera support includes a rotatable mount and the work surface is provided with an image or article supporting plate movable in two directions. Diagonal supports brace the U-shaped frames and also provide supports for light sources to uniformly illuminate the work surface.

The above and other objects and advantages of the invention will become more evident from the following description and accompanying drawings forming part of this application.

Figure 4:
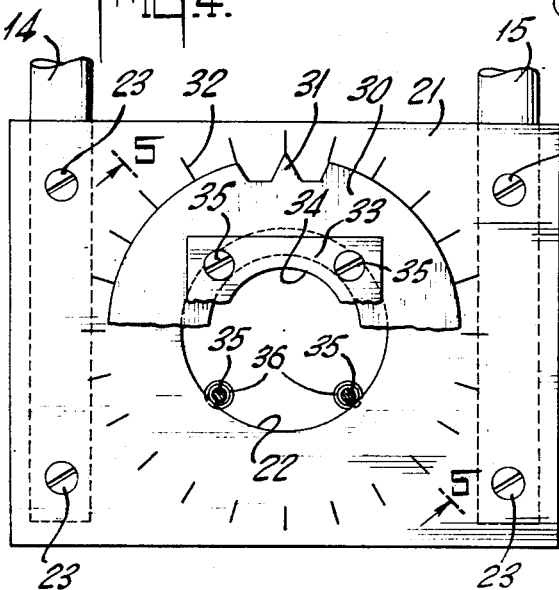
Figure 3:
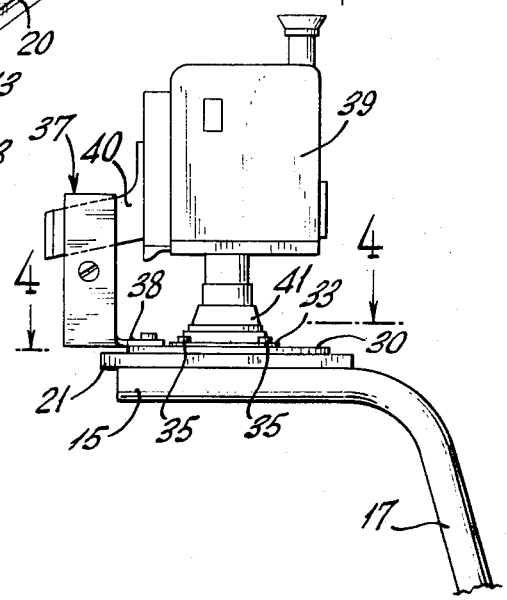
Figure 2:
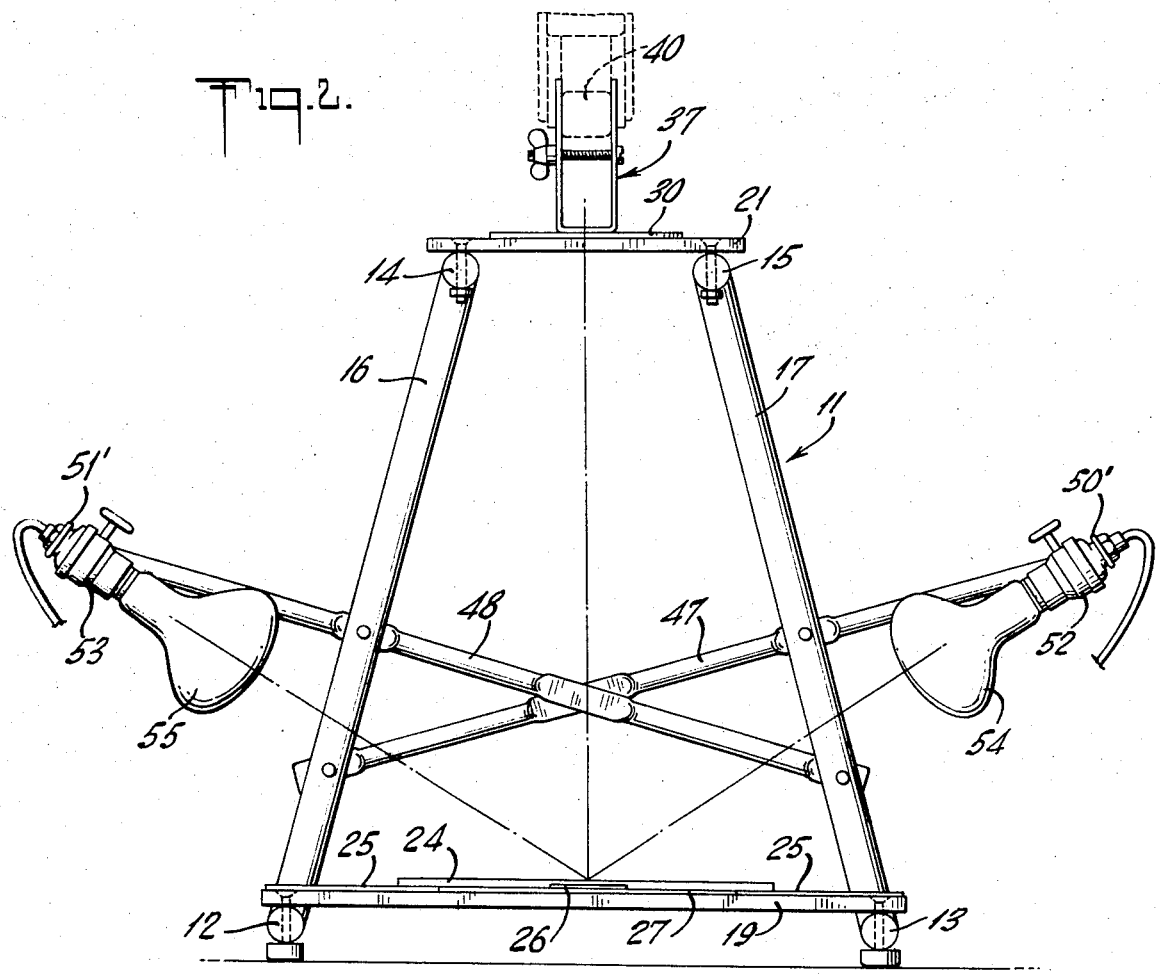
Figure 5:
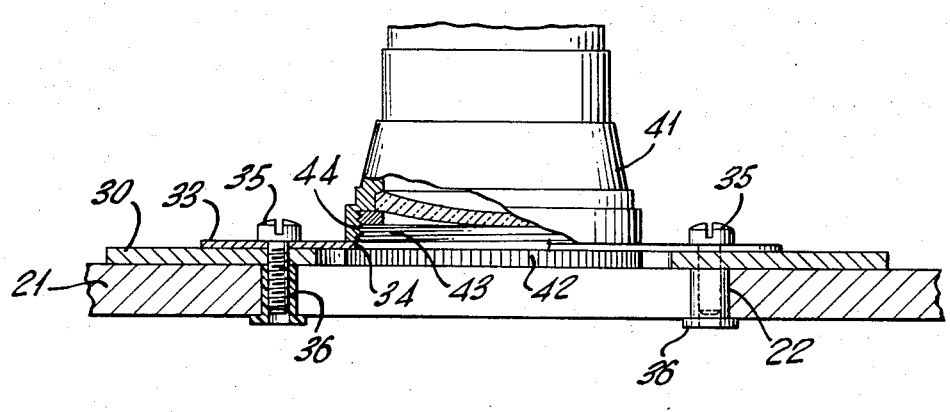

In the Drawings:

FIG. 1 is a partially exploded and sectioned perspective view of one embodiment of the invention, FIG. 2 is a front elevational view of the structure shown in FIG. 1, FIG. 3 is a fragmentary side elevational view of the camera support of FIG. 2 with a camera positioned thereon, FIG. 4 is a cross-sectional view of FIG. 3 taken along the line 4—4 thereof, and FIG. 5 is a cross-sectional view of FIG. 4 taken along the line 5—5 thereof.

The photographic stand in accordance with the invention includes a frame consisting of a pair of generally U-shaped tubular members 10 and 11 having relatively long bottom legs 12 and 13, short upper legs 14 and 15 and inclined upwardly extending portions 16 and 17 formed integrally with the legs. A work surface 18 which may have a layer 19 of a plastic or other suitable material is secured to the bottom legs 12 and 13 by screws 20. A camera supporting plate 21 having a central opening 22 is secured to the legs 14 and 15 by screws 23. The angular relationship of the frame portions 16 and 17 to the legs 12, 13, 14 and 15 is adjusted so that the camera supporting plate 21 is parallel to the work surface 18 with the opening 22 aligned with the center of the work surface.

In order to facilitate displacement of the images or articles to be photographed, the work surface is provided with a universally movable plate 24. Universal movement of plate 24 is attained by an intermediate support including a flat strip 25 secured to the work surface 18. A second strip 26 is positioned transversely of the strip 25 and carries guides or blocks 27 and 28 which slidably engage strip 25 and maintain the angular relationship of the strips 25 and 26. The plate 24 has a recess 29 on the underside thereof to slidably engage the strip 26. In this way the plate can be moved in any direction relative to the work surface 18.

The camera mounting plate 21 includes a camera mount which facilitates rotation of the camera relative to the plate 24 on the work surface. The camera mount comprises a disc 30 having an indexing pointer 31 formed in the edge thereof for cooperation with an angular scale 32. The disc 30 is rotatably secured to the plate 21 by a rectangular plate 33 having a central opening 34 therein. Both plate 33 and disc 30 have aligned openings 33' and 30' respectively to receive screws 35. Flanged nuts 36 engage the screws 35 and, when in position as shown in FIGS. 4 and 5, slidably engage the edge of openings 22 in plate 21 with the flanges on the nuts engaging the underside of plate 21 to hold the disc 30 in place thereon. A U-shaped camera handle clamp 37 is secured to the disc 30 by a bracket 38 to hold the handle 40 of the camera 39 as shown in FIG. 3. The camera lens 41 of camera 30 is secured to the plate 33 by a compensating lens structure 42 which has an externally threaded flanged collar 43 extending through the opening 34 in plate 33 and engaging the internal threads 44 on the lens 41. The compensating lens 42 modifies the focal length of the camera lens so that the camera can be focused on the plate 24 carried by the work surface 18. With this arrangement the camera can be quickly and easily mounted on the stand and, at the same time, the compensating lens and/or filters may be quickly and easily changed.

In order to provide a high degree of rigidity for the stand, a pair of diagonal braces 45 and 46 are secured to the upwardly extending stand portions 16. The braces 45 and 46 are L-shaped with the rear legs 47 and 48 being secured to stand portions 16 and 17 by bolts 49 or other suitable fastening means. The side legs 50 and 51 extend forwardly and terminate in flattened portions 50' and 51' which carry sockets 52 and 53 for supporting and energized suitable light sources 54 and 55 such as high intensity internal reflector lamps or the like. The angle of each flattened portion 50' and 51' is adjusted so that the light sources will uniformly illuminate the area of the work surface being photographed.

The photographic stand as described above affords many of the advantages of more complicated and expensive devices and yet can be manufactured at a relatively low cost, can be readily disassembled for shipping and storage, and can be utilized with a wide variety of motion picture cameras. It is of course apparent that still cameras may also be utilized if desired.

While only one embodiment of the invention has been illustrated and described, it is understood that alterations, changes, and modifications may be made without departing from the true scope and spirit thereof as defined by the appended claims.

What is claimed is:

1. A photographic stand comprising a frame having a pair of spaced U-shaped members each having a relatively long lower horizontal leg portion, an upwardly extending portion forming an angle less than 90° with said leg portion and inclined toward the other U-shaped member, and a relatively short upper horizontal leg portion parallel with the first said leg portion, the distance between the upper leg portions being less than the distance between the lower leg portions, a work surface secured to the first said leg portions, a pair of reversely inclined braces removably secured to said upwardly extending portions with the upper end of each inclined brace having a lamp carrying portion extending in the direction of said leg portions and camera supporting means carried by said upper leg portions and having a central opening therein aligned with the center of said work surface.

2. A photographic stand according to claim 1 wherein said camera supporting means comprises a plate having a central opening therein, a rotatable camera mounting disc carried by said plate, said disc having an opening therein, a flanged threaded collar within said opening for engaging internal threads on said camera lens to secure the camera in position on said disc, and a U-shaped bracket carried by said disc for engaging the handle of said camera.

* * * * *